United States Patent [19]

Schlossberg

[11] 4,121,178
[45] Oct. 17, 1978

[54] LASER CAPABLE OF PRODUCING A FREQUENCY STANDARD

[75] Inventor: Howard R. Schlossberg, Lexington, Mass.

[73] Assignee: The United States of America as represented by the Secretary of the Air Force, Washington, D.C.

[21] Appl. No.: 734,842

[22] Filed: Nov. 5, 1976

[51] Int. Cl.$^2$ .......................... H01S 3/13; H01S 3/23
[52] U.S. Cl. .................... 331/94.5 G; 331/94.5 C; 331/94.5 N; 331/94.5 PE; 331/94.5 S
[58] Field of Search ............... 330/4.3; 331/94.5 C, 331/94.5 M, 94.5 S, 94.5 N, 94.5 P, 94.5 PE, 94.5 G

[56] References Cited

U.S. PATENT DOCUMENTS

| | | | |
|---|---|---|---|
| 3,686,585 | 8/1972 | Javan et al. | 331/94.5 S |
| 3,753,148 | 8/1973 | Billman | 331/94.5 C |
| 3,755,678 | 8/1973 | Javan | 357/30 |

OTHER PUBLICATIONS

Whitford et al., IEEE Trans. on Instrum. Meas., vol. IM23, No. 4, Dec. 1974, pp. 535–539.
Petersen et al., IEEE Jour. Quant. Electron., vols. QE11, No. 10, pp. 838–843, and QE12, No. 2, pp. 86–87, (Oct. 1975 and Feb. 1976).
Freed et al., Appl., Phys. Lett., vol. 17, No. 2, 15 Jul. 1970, pp. 53–56.
Stein, IEEE Jour. Quant. Electron., vol. QE11, No. 8, Aug. 1975, pp. 630–631.

*Primary Examiner*—William D. Larkins
*Attorney, Agent, or Firm*—Joseph E. Rusz; Jacob N. Erlich

[57] ABSTRACT

A laser for producing a stable frequency standard which finds applicability within a clock. The laser contains a pair of active materials having close but non-overlapping gain profiles so that the laser can oscillate at frequencies particular to each active material without interraction therebetween. The beat frequency generated between the two laser frequencies is highly stable and can be readily used as a frequency standard.

8 Claims, 1 Drawing Figure

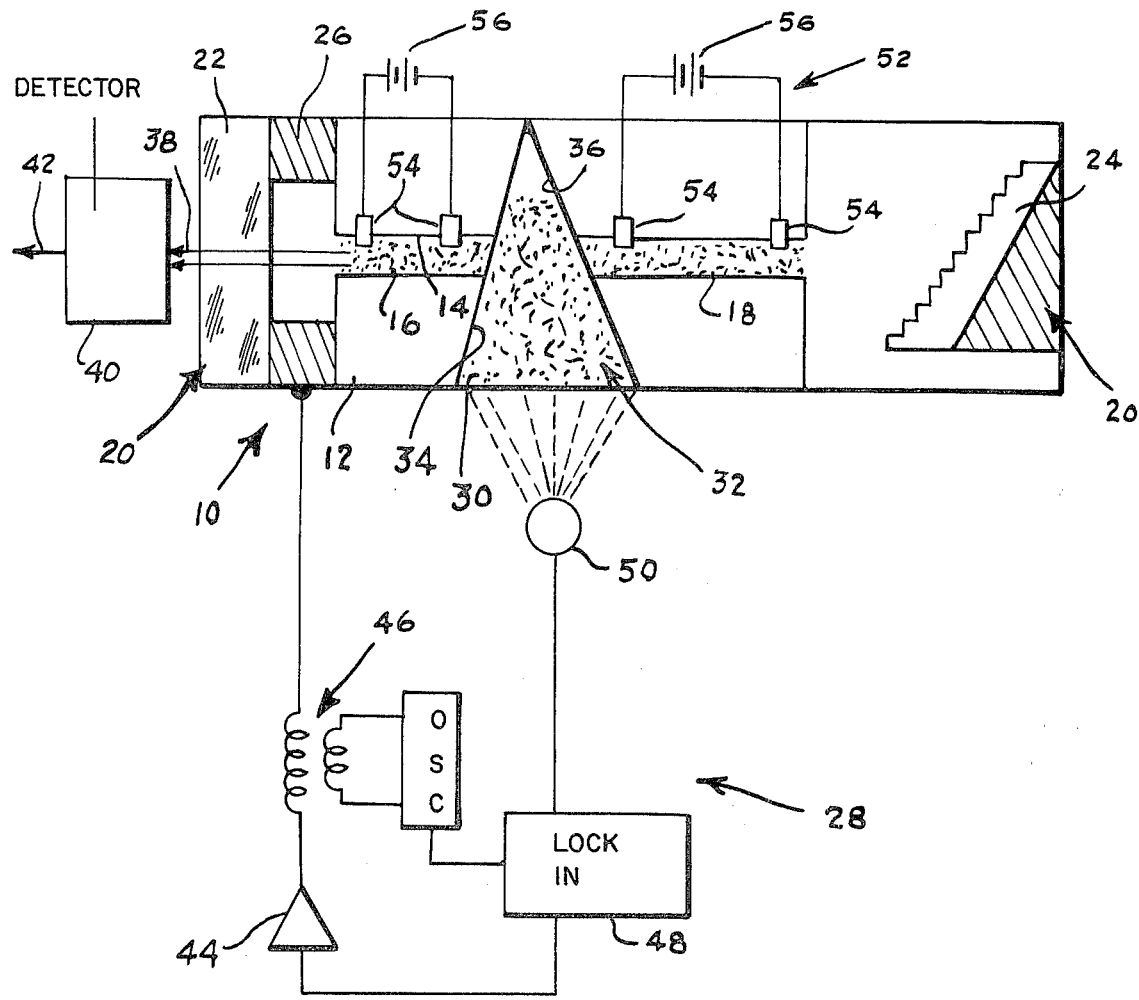

LASER CAPABLE OF PRODUCING A FREQUENCY STANDARD

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a device for producing a frequency standard, and, more particularly, to a small, rugged and relatively inexpensive laser for providing a stable frequency standard for use within a clock.

Most clocks, and, in particular, clocks which are extremely accurate and precise are based, in their operation, on frequency standards. For periodic events, the time between the events, $t$, is related to the frequency, $\nu$, of their occurrence by the simple equation $\nu = 1/t$. Periodic events can be used to define time, i.e., the generator of the periodic events — the frequency standard — can be used as a clock. The frequency standard becomes a clock by the addition of a counting mechanism for the events.

The first clocks based on a frequency standard (a pendulum) were invented about 400 years ago. This type of clock is still most widely used today. The pendulum may be a suspended weight (gravitational pendulum) like in "grandfather" clocks or the balance (torsion pendulum) of modern wristwatches. The instant invention deals with today's most advanced frequency standards and clocks; however, a close look at traditional clocks show all the essential features which are utilized in quartz crystal and atomic clocks.

The unit of time today is the second (symbol $s$). The second is defined in reference to a frequency determining element. Since 1967 by international agreement this "natural pendulum" is the cesium atom. One second is defined in the official wording as "the duration of 9192 631 770 periods of the radiation corresponding to the transition between the two hyperfine levels of the ground state of the cesium-133 atom". Accordingly, the frequency of the cesium pendulum is 9192 631 770 events per second (the cesium atom is a very rapidly oscillating pendulum). The unit of frequency is then defined as hertz (symbol Hz) which means the repetitive occurrence of one event per second (the use of "hertz" is preferred to the older term "cycle per second", cps).

Many kinds of frequency determining elements have been and are being used in frequency standards. They can be grouped into three classes: mechanical resonators; electronic resonators; atomic resonators.

As far as mechanical resonators are concerned most accurate clocks deal only with the quartz crystals. Other mechanical resonators like the pendulum and the tuning fork are of no importance in today's high performance frequency standards although they have been historically very important and are still widely used in low performance devices (e.g., in watches). For similar reasons electronic resonators like the tank circuits are unable to provide an adequate frequency standard for high precision clocks. Atomic resonators form the heart of our most accurate frequency standards and clocks.

Unfortunately, the atomic resonators such as the Cesium Beam Frequency Standard, Rubidium Gas Cell Frequency Standard and Atomic Hydrogen Maser leave much to be desired when it comes to the production of a small, lightweight, rugged, inexpensive high performance clock. Frequency standards based on locking a laser to a low pressure absorption feature have also produced excellent characteristics. However, this type of frequency standard requires large, awkward and expensive multiplier chains to translate their frequency into a usable region.

SUMMARY OF THE INVENTION

The instant invention sets forth a laser capable of providing a frequncy standard for use in a clock. This invention overcomes the problems set forth hereinabove by providing a frequency standard of high stability and excellent drift characteristics in a small, rugged and inexpensive package.

The device for providing a frequency standard for a clock of this invention, although not limited to, is, generally, in the form of a high pressure gas laser preferably in the form of a waveguide laser operated with a pair of gain sections. Each section utilizes a different isotopic specie of the active laser gas. The isotopes are chosen so that their gain frequencies are separated by a convenient amount, that is, the difference is capable of being used by conventional counting means in a clock, and the isotope gain profiles are essentially non-overlapping. As a result thereof, the laser can oscillate at frequencies particular to each isotope without interraction between them. One of the frequencies is stabilized by means of a low pressure absorbing gas, using, for example a Lamb Dip. The beat frequency between the two laser frequencies is then highly stable and can be used as a frequency standard in a clock or the like.

It is therefore an object of this invention to provide a laser capable of producing a stable frequency standard for use in a clock.

It is another object of this invention to provide a laser, capable of producing a frequency standard, which is relatively small and rugged in construction.

It is still another object of this invention to provide a laser capable of producing a frequency standard and which is economical to produce and utilizes conventional, currently available components in its manufacture.

For a better understanding of the present invention together with other and further objects thereof, reference is made of the following description taken in conjunction with the accompanying drawing and its scope will be pointed out in the appended claims.

DESCRIPTION OF THE DRAWING

The only FIGURE of the drawing is a side elevational view, shown partly in cross-section, of the laser of this invention capable of producing a stable frequency standard with a portion thereof being shown schematically.

DESCRIPTION OF THE PREFERRED EMBODIMENT

Reference is now made to the only FIGURE of the drawing which illustrates the laser 10 of this invention. Laser 10 is made up of a suitable outer structure 12, of for example, a ceramic material such as BeO. Contained within outer structure 12 is an area 14, preferably in the form of a waveguide structure having a spacing of approximately 1mm, for containing a pair of active materials 16 and 18. Although not limited to a gas, active materials 16 and 18 may be in the form of two isotopic species of the same gas such as $CO_2^{16}$ and $CO_2^{18}$ and having close but non-overlapping gain profiles. Enclosing waveguide structure 14 is a conventional laser resonator 20, in the form of a pair of reflecting means such as partially reflecting mirror 22 and a substantially fully reflective grating 24. A suitable piezoelectric mount 26 is interposed between mirror 22 and waveguide structure 14 for electrical connection to a conventional locking means 28 in a manner described hereinbelow.

Interposed between active materials or gases 16 and 18 is a low pressure absorbing gas 30 such as $CO_2^{16}$. Gas 30 is contained within resonator 22 in any suitable containing means or cell 32 in the form of a pair of Brewster windows 34 and 36. Operatively connected to an output 38 emanating from mirror 22 of laser 10 is a conventional detector 40 such as HgCdTe detector which is capable of detecting two laser frequencies within output 38 and has sufficient speed of response to the difference frequency in order to produce an output 42 at that difference frequency.

Locking means 28 which is electrically connected to piezoelectric mount 26 is conventional in construction, being composed of a feedback amplifier or DC amplifier 44, a modulator or audio frequency source 46, a phase sensitive amplifier or lock-in amplifier 48 and an IR detector 50. The operation of such a locking means 28 is fully described in U.S. Pat. No. 3,686,585. Means for activating or energizing laser 10 takes the form of any conventional DC discharge circuit 52 made up of electrodes 54 and DC sources 56.

In operation the diffraction grating 24 is tuned so that laser 10 oscillates simultaneously on the R(10) line of the 001-020 band of $CO_2^{16}$ and the P(16) line of the 001-100 band of $CO_2^{18}$ (these two lines being approximately 5.05 GHz apart) with approximately equal losses. The pressures of $CO_2^{16}$ and $CO_2^{18}$, both about 300 torr are adjusted so that the quantity
$S = Q_A/Q_C$ is as nearly the same as can be achieved for the two lines, better than 10%, where $Q_A$ is the molecular line Q and $Q_C$ is the optical resonator Q for each line. The total length between mirror 22 and grating 24 (approximately 29.7 cm) is adjusted to make the free spectral range of resonator 20 equal to 1/10 the frequency between the two laser lines (approximately 505 MHz). The laser frequency is stabilized at the center of the R(10) $CO_2^{16}$ line by means of the Lamb Dip seen in spontaneous emission from the low pressure $CO_2^{16}$ gas 30 in container 32 by locking means 28.

The output 38 generated by laser 10, in the form of two laser frequencies, is taken from end mirror 22 and fed into detector 40 which is capable of responding to the 5.05 GHz beat frequency between the two laser frequencies. This beat frequency or output 42 of laser 10 of this invention is used as a stable reference frequency in a conventional manner by locking a high harmonic of an RF oscillator at approximately 5MHz to it.

The analysis presented hereinbelow shows that frequency stabilities approaching or exceeding 3 parts in $10^{12}$ are feasible with the instant invention. In addition, excellent drift rates are also obtainable.

The frequency $\omega$ of a pressure broadened laser oscillator is given by $$(\omega - \omega_c) = S(\omega_o - \omega)$$

plus higher order terms in $(\omega - \omega_c/\omega)$ which can be neglected. $\omega_c$ is an empty cavity resonant frequency given by $mc/2L$ with L the optical path length between mirrors, c the speed of light and m an integer of order 3

$\times 10^4$, and $\omega_o$ is the center frequency of the molecular transition responsible for laser gain. For the R(10) and P(16) lines utilized with this invention let all quantities be denoted by 1 and 2 respectively. Then $$\omega - \omega_c = S(\omega_o - \omega)$$

$$\omega_1 = (m_1 c/2L) + S_1 \omega_{o1} - S_1 \omega_1$$

$$\omega_2 = (m_2 c/2L) + S_2 \omega_{o2} - S_2 \omega_2$$

$$\omega_1 - \omega_2 = (m_1 - m_2) c/2L + S_1 \omega_{o1} - S_2 \omega_{o2} + S_2 \omega_2 - S_1 \omega_1$$

suppose $\omega_1$ changes by an amount $\delta\omega_1$ due to a change in L of $\delta L$. Then $$\delta\omega_1 = -\frac{m_1 c}{2L} \frac{\delta L}{L} - S_1 \delta\omega_1 \qquad (1)$$

$$\delta\omega_2 = -\frac{m_2 c}{2L} \frac{\delta L}{L} - S_2 \delta\omega_2 \qquad (2)$$

$$\frac{\delta L}{L} = -(1 + S_1) \delta\omega_1 \frac{2L}{m_1 c} \qquad (1')$$

$$\delta\omega_2 = +\frac{m_2}{m_1} \frac{(1 + S_1)}{(1 + S_2)} \delta\omega_1 \qquad (2')$$

$$\delta(\omega_1 - \omega_2) = [1 - \frac{m_2}{m_1} \frac{(1 + S_1)}{(1 + S_2)}] \delta\omega_1 = \qquad (3)$$

$$[\frac{m_1(1 + S_2) - m_2(1 + S_1)}{m_1(1 + S_2)}] \delta\omega_1 =$$

$$[\frac{m_1(1 + S_2) - m_1(1 + S_1) - K(1 + S_1)}{m_1(1 + S_2)}] \delta\omega_1 =$$

$$[\frac{S_2 - S_1}{1 + S_2} - \frac{K}{m_1} \frac{(1 + S_1)}{(1 + S_2)}] \delta\omega_1$$

where $K = m_1 - m_2$ is an integer
To a sufficient approximation then $$\delta(\omega_1 - \omega_2) = [S_2 - S_1 - \frac{K}{m_1}] \delta\omega_1$$

and $$\frac{\delta(\omega_1 - \omega_2)}{(\omega_1 - \omega_2)} = \frac{2L}{KC} [S_2 - S_1 - \frac{K}{m_1}] \delta\omega_1$$

Let $S_2 - S_1 = a S$ where $a$ is the fraction of $S_1$ or $S_2$ to within which the two S's can be kept equal.

$$S = \frac{Q_A}{Q_C} \; ; \; Q_A = \frac{\omega_0}{\Delta\omega} \text{ with } \Delta\omega \text{ the molecular transition linewidth}$$

$$Q_C = \frac{2\pi L}{\lambda l} \text{ with } l \text{ the cavity losses}$$

$$S = \frac{lc}{\Delta\omega L}$$

$$\frac{\delta(\omega_1 - \omega_2)}{(\omega_1 - \omega_2)} = \frac{2}{K} (al) \frac{\delta\omega_1}{\Delta\omega} - \frac{\delta\omega_1}{\omega_1}$$

Suppose for example $a = 0.1$  $1 = 2\%$; $\delta\omega_1 = 10$ HZ K = 10 and $\Delta\omega = 1.350$ GHZ (300 torr at 400° K.) Then $$\frac{\delta(\omega_1 - \omega_2)}{(\omega_1 - \omega_2)} \approx 3.3 \times 10^{-12}$$

Although this invention has been described with reference to a particular embodiment, it will be understood to those skilled in the art that this invention is also capable of a variety of alternate embodiments such as the utilization of a pair of solid active materials or the utilization of a pair of different gases, all within the spirit and scope of the appended claims.

I claim:

1. A laser capable of producing a stable frequency standard comprising means for containing a pair of different active materials, a pair of active materials located in said containing means, said containing means being configured so as to allow high pressure operation to take place therein, each of said pair of active materials being gaseous and maintained in said containing means under said high pressure, said active materials having close but non-overlapping gain profiles, a resonator enclosing said containing means, means for activating said active materials thereby producing an output in the form of two laser frequencies, means for containing an absorbing gas, an absorbing gas located within said absorbing gas containing means, said absorbing gas having an absorption profile which is overlapped by one of said laser frequencies, means operably connected to said resonator for locking said overlapping laser frequency to the center of said absorption profile of said absorbing gas and means for detecting said two laser frequencies and producing a single output at the difference frequency between said two laser frequencies.

2. A laser capable of producing a stable frequency standard as defined in claim 1 wherein said locking means locks said overlapping laser frequency to the Lamb Dip of said absorption profile of said absorbing gas.

3. A laser capable of producing a stable frequency standard as defined in claim 2 wherein said containing means for said absorbing gas is located within said resonator and is in the form of Brewster angle windows.

4. A laser capable of producing a stable frequency standard as defined in claim 3 wherein all of said gases are isotopic species of $CO_2$.

5. A laser capable of producing a stable frequency standard as defined in claim 1 wherein said active materials are two isotopic species of the same gas.

6. A laser capable of producing a stable frequency standard as defined in claim 5 wherein said means for containing said active materials is in the form of a waveguide structure.

7. A laser capable of producing a stable frequency standard as defined in claim 1 wherein said high pressure is at least 300 torr.

8. A laser capable of producing a stable frequency standard as defined in claim 7 wherein the expression $Q_A/Q_C$ for each of said active materials is made substantially identical and where $Q_A$ is the molecular line Q and $Q_C$ is the optical resonator Q.

* * * * *

UNITED STATES PATENT OFFICE
CERTIFICATE OF CORRECTION

Patent No. 4,121,178          Dated October 17, 1978

Inventor(s) Howard R. Schlossberg

It is certified that error appears in the above-identified patent and that said Letters Patent are hereby corrected as shown below:

Column 3, line 65,

"$(\omega-\omega_c/\omega)$" should read -- $\left(\dfrac{\omega-\omega_c}{\omega}\right)$ --

Signed and Sealed this

Twenty-fourth Day of April 1979

[SEAL]

Attest:

RUTH C. MASON
Attesting Officer

DONALD W. BANNER
Commissioner of Patents and Trademarks